(12) United States Patent
Ke et al.

(10) Patent No.: US 8,805,395 B2
(45) Date of Patent: Aug. 12, 2014

(54) IMPLEMENTATION METHOD FOR IMPROVING SERVICE CALL COMPLETION RATIO AND RADIO NETWORK CONTROLLER

(75) Inventors: Wen Ke, Shenzhen (CN); Meiqing Huang, Shenzhen (CN); Lirong Shi, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 13/696,352

(22) PCT Filed: May 12, 2011

(86) PCT No.: PCT/CN2011/073983
§ 371 (c)(1),
(2), (4) Date: Nov. 6, 2012

(87) PCT Pub. No.: WO2011/160504
PCT Pub. Date: Dec. 29, 2011

(65) Prior Publication Data
US 2013/0053052 A1    Feb. 28, 2013

(30) Foreign Application Priority Data
Jun. 25, 2010 (CN) .......................... 2010 1 0220752

(51) Int. Cl.
H04W 88/02 (2009.01)
(52) U.S. Cl.
USPC ....................................................... 455/452.1
(58) Field of Classification Search
USPC ............ 455/452.1, 501; 370/241.1, 252, 328, 370/331, 280, 281
See application file for complete search history.

(56) References Cited

U.S. PATENT DOCUMENTS

2012/0120789 A1* 5/2012 Ramachandran et al. .... 370/220
2013/0114479 A1* 5/2013 Seo et al. ...................... 370/281
2013/0286851 A1* 10/2013 Moser et al. ............... 370/241.1

FOREIGN PATENT DOCUMENTS

| CN | 1964555 A | 5/2007 |
| CN | 101646213 A | 2/2010 |
| CN | 101730061 A | 6/2010 |
| CN | 101730162 A | 6/2010 |

OTHER PUBLICATIONS

International Search Report for corresponding International Application No. PCT/CN2011/073983 filed on May 12, 2011; Mail date Aug. 25, 2011.

* cited by examiner

*Primary Examiner* — Diane Mizrahi
(74) *Attorney, Agent, or Firm* — Cantor Colburn LLP

(57) ABSTRACT

The present invention provides an implementation method for improving a service call completion ratio and a radio network controller. a radio network controller sends a radio bearer establishment message to a user equipment; the radio network controller judges whether a radio bearer response message from the user equipment is not received within a first predetermined period, and if YES, the radio network controller triggers the user equipment to report a cell update message; the radio network controller receives the cell update message from the user equipment and determines a configuration status of the user equipment according to information carried in the cell update message and/or time when receiving the cell update message; and the radio network controller performs call reestablishment processing according to the configuration status of the user equipment.

11 Claims, 10 Drawing Sheets

IMPLEMENTATION METHOD FOR IMPROVING SERVICE CALL COMPLETION RATIO AND RADIO NETWORK CONTROLLER

FIELD OF THE INVENTION

The present invention relates to communication field, and in particular to an implementation method for improving a service call completion ratio and a radio network controller.

BACKGROUND OF THE INVENTION

The call completion ratio is an important index to measure the network performance and directly influences the call experience of users. If the call completion ratio is low, a user will initiate a call request again if the user has one dial-up failed, which not only decreases the user experience, but also wastes network resources, and simultaneously, causes easily problems such as network congestion, etc. Therefore, how to improve the service call completion ratio has become an important research subject.

FIG. 1 is a flow chart of a successful service establishment in the related art. As shown in FIG. 1, when a User Equipment (UE) initiates one call according to 3GPP technical specifications, firstly the UE sends a Radio Resource Control (RRC) connection request to a Radio Network Controller (RNC); the RNC allocates radio resources for the UE and sends a RRC connection establishment message to the UE to guide the UE to establish a signaling radio bearer; and the UE sends a RRC connection establishment completion message to the RNC after completing the RRC radio resource configuration. After the RRC signaling connection establishment process is completed, the UE performs Non Access Stratum (NAS) signaling interactions with a Core Network (CN) through direct transfer messages; the CN sends a service assignment message to the RNC; the RNC receives the assignment message, allocates a service bearer for the UE and sends a radio bearer establishment message to the UE to guide the UE to establish a service radio bearer; and the UE sends a radio bearer establishment completion message to the RNC after completing the configuration. The RNC returns a service establishment completion message to the CN after receiving the radio bearer establishment completion message.

The call failure may be caused by many factors, among which the call failure resulted from the quality of the radio environment is particularly prominent. During the call establishment process, the RNC sends the radio bearer establishment message to the UE and waits the UE to return a response. FIG. 2 is a flow chart of air interface failures in the related art, and as shown in FIG. 2, the quality of the air interface causes several failures as follows: I. the UE is unable to correctly receive a Radio Bearer (RB) establishment message from the network side (210); II. the UE receives the RB establishment message and returns a response, but the network side does not receive the response (220); III. the UE receives the RB establishment message, but a radio link failure is detected during the reconfiguration process, and therefore the reconfiguration flow ends (230). The above situations finally cause the service establishment failure (240).

When the quality of the air interface deteriorates, the UE will detect the radio link failure of the physical layer or the unrecoverable error of the Radio Link Control (RLC) layer, notify the RRC layer, and initiate a cell update message with a cause of "Radio Link Failure" or "Unrecoverable RLC". After receiving the message, the RNC executes the reestablishment flow of the radio link wherein firstly the RNC deletes the radio link corresponding to the UE, and switches into the public status; and then the RNC prepares establishing a new link, and sends a cell update acknowledgment message in a downlink public transmission channel in order to send the new configuration information to the UE. To make the description simple and convenient, this process is called call reestablishment in the present invention.

Although the call reestablishment may solve the problem of the deterioration of the quality of the air interface, there are still two problems in the case of call failures:

(1) Although call reestablishment may retrieve calls through the reestablishment of the radio link, it is necessary to ensure that configurations at both the network side and the UE side must be kept synchronous, and due to the complexity of the quality of the air interface, the RNC is unable to accurately determine the current status of the UE.

(2) During the service establishment process, if the quality of the air interface deteriorates and the UE reports the cell update, the RNC may retrieve calls by executing the call reestablishment flow. However, if the UE does not report the cell update in time, the call drop will be caused, and thereby the service call completion ratio is greatly reduced.

SUMMARY OF THE INVENTION

In view of this, the present invention provides an implementation method for improving a service call completion ratio and a radio network controller, which can improve the network call completion ratio.

The present invention provides an implementation method for improving a service call completion ratio, comprising: a radio network controller sending a radio bearer establishment message to a user equipment; the radio network controller judging whether a radio bearer response message from the user equipment is not received within a first predetermined period, and if YES, the radio network controller triggering the user equipment to report a cell update message; the radio network controller receiving the cell update message from the user equipment and determining a configuration status of the user equipment according to information carried in the cell update message and/or time when receiving the cell update message; and the radio network controller performing call reestablishment processing according to the configuration status of the user equipment.

The present invention also provides an implementation method for improving a service call completion ratio, comprising: a serving radio network controller sending a radio bearer establishment message to a user equipment; the serving radio network controller judging whether a radio bearer response message from the user equipment is not received within a first predetermined period, and if YES, the serving radio network controller triggering the user equipment to report a cell update message; the serving radio network controller sending a radio link deactivation message or a radio link deletion message to a drift radio network controller; the serving radio network controller receiving the cell update message from the user equipment and determining a configuration status of the user equipment according to information carried in the cell update message and/or time when receiving the cell update message; and the serving radio network controller performing call reestablishment processing according to the configuration status of the user equipment.

The present invention provides a radio network controller, comprising: a sending module, configured to send a radio bearer establishment message to a user equipment; a first judging module, configured to judge whether a radio bearer response message from the user equipment is not received within a first predetermined period; a triggering module, configured to trigger, when a result of judgment of the first judging module is YES, the user equipment to report a cell update message; a receiving module, configured to receive the cell update message from the user equipment; and a second judging module, configured to determine a configuration status of the user equipment according to information carried in the cell update message and/or time when receiving the cell update message; and a reestablishment processing module, configured to perform call reestablishment processing according to the configuration status of the user equipment determined by the second judging module.

The present invention also provides a radio network controller, comprising: a first sending module, configured to send a radio bearer establishment message to a user equipment;

a first judging module, configured to judge whether a radio bearer response message from the user equipment is not received within a first predetermined period;

a triggering module, configured to trigger, when a result of judgment of the first judging module is YES, the user equipment to report a cell update message;

a second sending module, configured to send a radio link deactivation message or a radio link deletion message to a drift radio network controller;

a receiving module, configured to receive the cell update message from the user equipment;

a second judging module, configured to determine a configuration status of the user equipment according to information carried in the cell update message and/or time when receiving the cell update message; and a reestablishment processing module, configured to perform call reestablishment processing according to the configuration status of the user equipment determined by the second judging module.

Compared with the related art, according to the technical solution of the present invention, by inserting call reestablishment during the service establishment process, the RNC triggers the UE to report the cell update message to determine the configuration status of the UE, so that the configuration states of both the RNC and the UE are consistent during the call reestablishment processing, and thereby the network call completion ratio is improved, the network resource utilization is further improved, and excellent user experience is provided.

DETAILED DESCRIPTION OF EMBODIMENTS

The basic concept of the present invention is that: a radio network controller sends a radio bearer establishment message to a user equipment; the radio network controller judges whether a radio bearer response message from the user equipment is not received within a first predetermined period, and if YES, the radio network controller triggers the user equipment to report a cell update message; the radio network controller receives the cell update message from the user equipment and determines a configuration status of the user equipment according to the information carried in the cell update message and/or the time when receiving the cell update message; and the radio network controller performs call reestablishment processing according to the configuration status of the user equipment.

The present invention will be further described in detail below with reference to drawings and specific embodiments.

Figure 1:
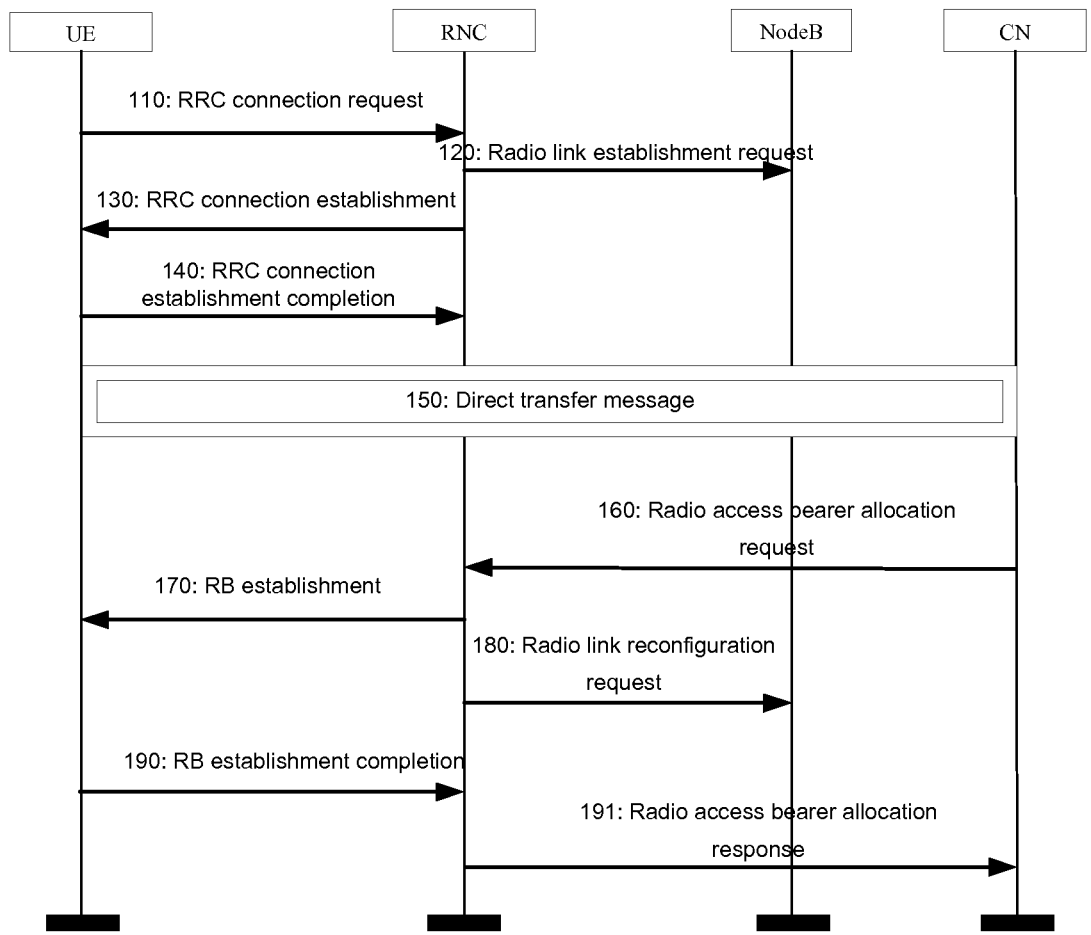
FIG. 1 is a flow chart of a successful service establishment in the related art.
Figure 2:
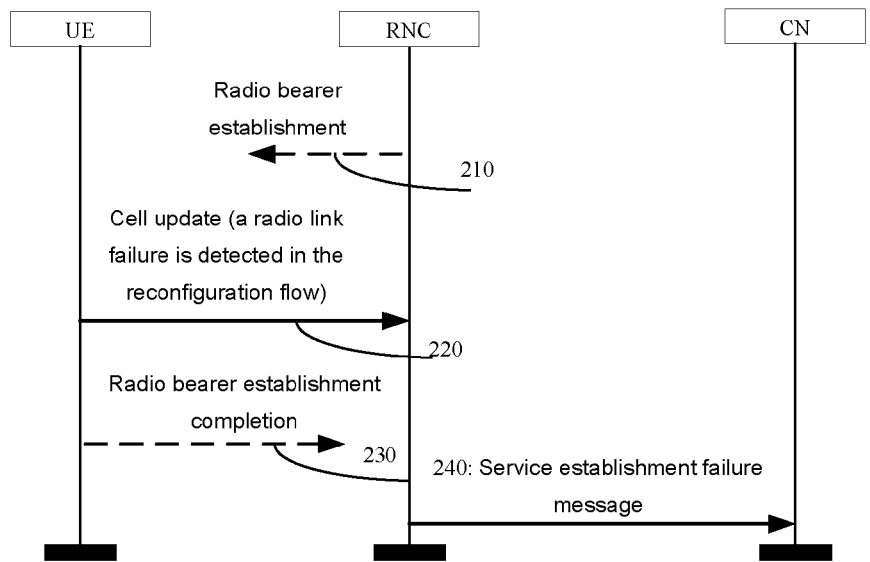
FIG. 2 is a flow chart of air interface failures in the related art.
Figure 3:
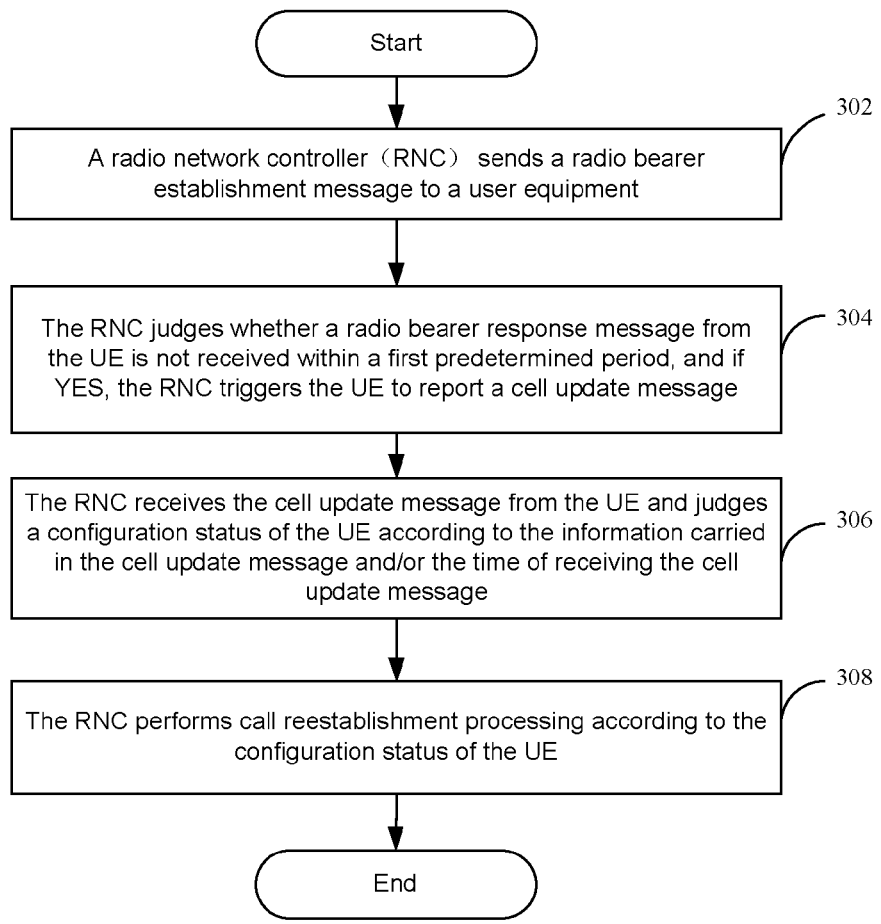
FIG. 3 is a flow chart of an implementation method for improving a service call completion ratio according to one embodiment of the present invention.

The present invention provides an implementation method for improving a service call completion ratio. FIG. 3 is a flow chart of an implementation method for improving a service call completion ratio according to one embodiment of the present invention. As shown in FIG. 3, the method comprises the steps as follows.

S302: An RNC sends a Radio Bearer (RB) establishment message to a UE.

S304: The RNC judges whether a radio bearer response message from the UE is not received within a first predetermined period, and if YES, the RNC triggers the UE to report a cell update message.

S306: The RNC receives the cell update message from the UE and determines the configuration status of the UE according to the information carried in the cell update message and/or the time when receiving the cell update message.

S308: The RNC performs call reestablishment processing according to the configuration status of the UE.

In S304, the step of the RNC triggering the UE to report the cell update message comprises, but is not limited to, the following two ways: RL deactivation way and RL deletion way, wherein the RL deactivation way means that the RNC sends an RL deactivation message to the NodeB to which the UE belongs to make the radio link stop downlink transmission and to result in the downlink desynchronizing of the UE. The UE sends the cell update message with a cause of the radio link failure to the RNC after the condition of reporting the radio link failure is met, and therefore the RNC executes the radio link reestablishment process. The RL deletion way means that the RNC sends an RL deletion message to the NodeB to which the UE belongs, and with a same purpose of making the UE lose downlink synchronization, makes the UE report the cell update message with the cause of the radio link failure to the RNC, and therefore the RNC executes the radio link reestablishment process. When the two ways are compared with each other, in the RL deactivation way, the uplink is still kept, while the RL deletion way is more thoroughgoing. But the purposes of the two ways are both to make the UE report the cell update message to execute the reestablishment of the radio link. After the RNC sends the RL deactivation message or the RL deletion message, it is necessary to set a timer T2 (a second predetermined period) to wait the UE to report the cell update message. Values of T313 and N313 may be referred to for setting the duration of the timer, wherein N313 is the number that the physical layer loses synchronization continuously, and T313 is the radio link failure report timer started after the physical layer loses synchronization continuously for N313. If the cell update message reported by the UE is not received before the timer times out, it may be regarded as an abnormal situation which is not discussed in the present invention. If this abnormal situation occurs, the RNC directly returns a service assignment failure to the CN. In the specific embodiments of the present invention, only a situation in which the RNC receives the cell update message before the timer T2 times out is considered.

During specific implementation, triggering the call reestablishment in the RL deactivation way is different from that in the RL deletion way. In the RL deactivation way, the call reestablishment process is to delete the link firstly and then reestablish a new link; and in the RL deletion way, the call reestablishment process only has a new link establishment process.

In S304, causes why the RNC does not receive a radio bearer response message from the user equipment within the first predetermined period may fall into the following three situations according to the time point of the air interface failure: (1) the sending of the air interface message (radio bearer response message) is failed; (2) failures occur during the air interface message processing process; (3) the response of the air interface response message is failed. These scenarios may cover all air interface failures caused by the quality of the air interface. The scenarios are distinguished for the purpose of making the RNC determine the status of the UE accurately and keep synchronous with the UE in terms of configuration.

Methods for distinguishing the above three situations will be described specifically below.

First, the three situations may be distinguished according to whether the timer for the RNC to wait the air interface response times out. Generally, The RNC sets a timer, that is, the air interface response message is waited within the first predetermined period. If the air interface response message is received within the first predetermined period, the timer is deleted, otherwise the timer times out, and the RNC regards the air interface as being abnormal and does not wait for the air interface message any more.

It should be noted that the setup of the first predetermined period (timer T1) should take into consideration the time required by the air interface response and the time of the IU interface timer. Under a condition of meeting the air interface configuration time, the duration for the RNC to wait the air interface response may be shortened properly. The setup of the second predetermined period (timer T2) may be determined according to the standard of meeting the radio link failure.

Specifically, first, the first predetermined period cannot be set too short. If it is too short, the UE side does not complete reconfiguration before (i.e. the network side times out in advance), and therefore the duration of the air interface timer at the network side is usually greater than the time TUE required by the air interface response. Specifically, the setup of the first predetermined period should take into consideration the message length, the air interface transmission, the UE processing and other factors, integrally. Therefore, T1>TUE.

Second, according to the embodiment of the present invention, the call reestablishment is inserted during the service establishment process, and therefore it is also necessary to take into consideration the time required by the call reestablishment when the first predetermined period is set, in order to prevent that the IU interface (interface between the RNC and the CN) timer T (i.e., period from the moment that the RNC receives the service assignment request from the CN to the moment that the RNC returns the service establishment completion to the CN) times out, otherwise the situation in which the IU interface times out even if the call reestablishment is successful will occur, and the purpose of retrieving calls is still failed. The duration for call reestablishment comprises the duration T2 (i.e., the second predetermined period) in which the UE detects the radio link failure and the duration required by the call reestablishment flow. Therefore, T1<T−T2.

According to the radio link failure report criterion, the time (i.e., the second predetermined period) when the radio link failure is detected at the UE side may be calculated by T313 and N313, that is, the time T2 (the second predetermined period) when the radio link failure is detected is equal to T313+N313*10 ms+160 ms+Toff, where N313 is the number that the physical layer loses synchronization continuously, T313 is the radio link failure report timer started after the physical layer loses synchronization continuously for N313, Toff is the system offset, and 160 ms is the fixed delay of synchronous detection.

In addition, the duration of the timer T1 should not be greater than the duration in which the radio link failure is detected in the new configuration after the new configuration takes effect, that is, T1<TUE+T2.

Therefore, in a case that the timer T1 does not time out, if the RNC receives the cell update with the cause of RL failure, it may be regarded that the UE does not switch into the new configuration (i.e., the second configuration status). This is because the sum of the duration of switching to the new configuration and the duration before the radio link failure is detected in the new configuration is greater than the duration T1 for which the RNC waits the air interface response. If the RNC receives the cell update with the cause of RL failure before the timer T1 times out, it may be regarded that the UE is still in the old configuration (i.e., the first configuration status).

After the timer T1 for waiting for the air interface response times out, the RNC may process according to whether the RLC layer of the RNC receives an ACK from the opposite end after the RNC sends an RB establishment message. If the RLC layer receives the ACK, it may be regarded that the UE receives the RB establishment message; otherwise, there are two situations if the RLC layer does not receive the ACK: (1) the UE does not receive the RB establishment message; and (2) The UE receives the RB establishment message and returns an ACK, but the RNC does not receive the ACK.

It should be noted that, for version R6 or other higher versions, the cell update message comprises a Reconfiguration Status Indicator cell, which indicates that the UE receives an RB establishment/RB reconfiguration/RB release message and is executing the reconfiguration flow, or the UE has already returned an RB response message and is waiting for the RLC ACK of the message. If the Cell Update sent by the UE does not carry the Reconfiguration Status Indicator cell, it may be regarded that the UE does not receive the RB establishment message.

Therefore, ways of distinguishing the above three situations according to the embodiment of the present invention comprise: if the cell update message does not carry the Reconfiguration Status Indicator cell, no matter the cell update message is received before or after the timer times out, it may be regarded that the UE does not receive the RB establishment message and the UE is still in the first configuration status (i.e., old configuration); if the cell update message, which is received after the timer T1 (i.e., the first predetermined period) times out, carries the cell, it may be regarded that the UE returns the RB response message and has switched to the second configuration status (i.e., new configuration); and if the cell update message received before the air interface timer (i.e., the first predetermined period) times out carries the cell, it may be regarded that the UE is executing the reconfiguration flow and is still in the old configuration.

In a case of determining that the UE has switched to the new configuration, the RNC also needs to switch to the new configuration. As the new configuration takes effect at the UE side when the UE returns a successful RB establishment response message, at this time, the RNC is processed according to the situation that it receives the air interface response and executes call reestablishment in the new configuration. Furthermore, as the RNC does not receive the air interface RB establishment completion message correctly, it is unable to obtain the ciphering information in the response message, while the UE will not make the encryption information take effect since the UE does not receive the Acknowledgment (ACK) from the RLC layer of the opposite end, and therefore the encryption information at both the network side and the UE side will not be inconsistent due to the loss of the air interface response message.

According to the above three situations of the air interface failure, the RNC performs the processing as follows, respectively.

(1) In a case that the UE does not receive the RB establishment message from the RNC, the UE is still in the old configuration; and the RNC executes call reestablishment in the old configuration, and then reestablishes a service RB after the call reestablishment is successful.

(2) In a case that the UE receives the RB establishment message and returns a successful response but the RNC does not receive the response message, the RNC retrieves calls by inserting the call reestablishment flow in the new configuration.

(3) In a case that the UE receives the RB establishment message but a radio link failure or unrecoverable RLC is detected during the reconfiguration process, the UE stops the reconfiguration flow, keeps the old configuration, and reports a cell update message with a cause of radio link failure. At this time, the RNC executes call reestablishment in the old configuration and then reestablishes a service RB after the call reestablishment is successful.

The embodiments of the present invention will be described in details below with reference to FIG. 4-FIG. 10.

Figure 4:
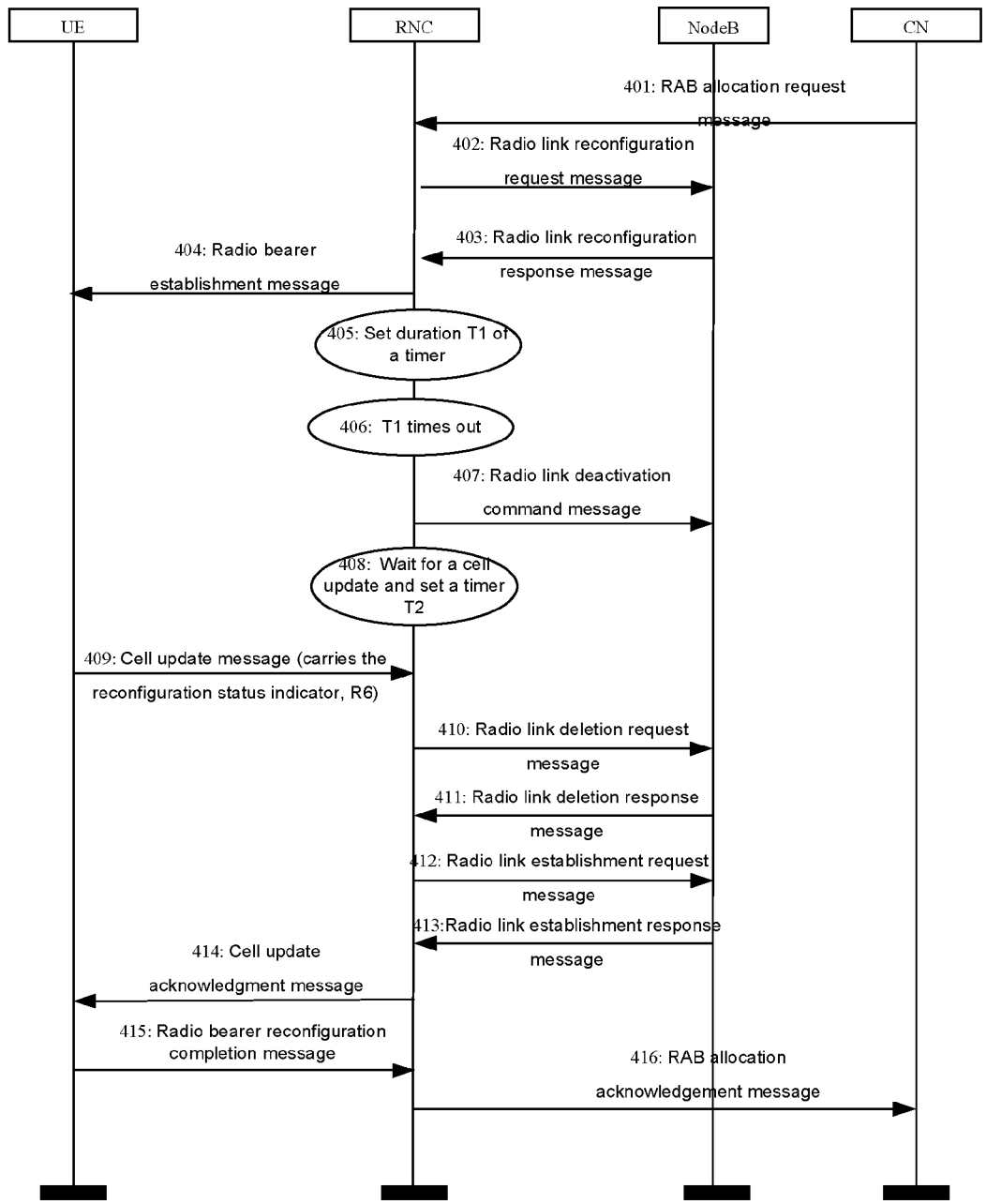
FIG. 4 to FIG. 10 are flow charts according to method embodiments in the present invention.

FIG. 4 shows a flow chart that the RNC receives a cell update message from the UE after RL (only comprising SRNC RL) is deactivated when the timer for the RNC waiting for the air interface RB establishment response times out during the service establishment process. As shown in FIG. 4, the flow specifically comprises the steps as follows.

S401: the RNC receives an RAB allocation request message sent by the CN.

S402: the RNC sends a radio link reconfiguration request message to the NodeB.

S403: the RNC receives a radio link reconfiguration response message returned by the NodeB.

S404: the RNC sends a radio bearer establishment message to the UE.

S405: the RNC sets an air interface timer T1 (the first predetermined period).

S406: the RNC determines that the timer T1 times out, that is, the RNC does not receive the response message from the UE within T1.

S407: the RNC sends a radio link deactivation command message to the NodeB to deactivate the radio link to which the UE belongs.

S408: the RNC sets a timer T2 (the second predetermined period) and waits for a cell update message from the UE.

S409: the RNC receives the cell update message from the UE before the timer T2 times out, and the cell update message carries the current reconfiguration status indicator of the UE.

S410: the RNC sends a radio link deletion request message to the NodeB.

S411: the RNC receives a radio link deletion response message returned by the NodeB.

S412: the RNC sends a radio link establishment request message to the NodeB.

S413: the RNC receives a radio link establishment response message returned by the NodeB.

S414: the RNC sends a cell update acknowledgment message to the UE.

S415: the RNC receives a reconfiguration completion message returned by the UE.

S416: the RNC sends a service assignment response message to the CN.

Figure 5:
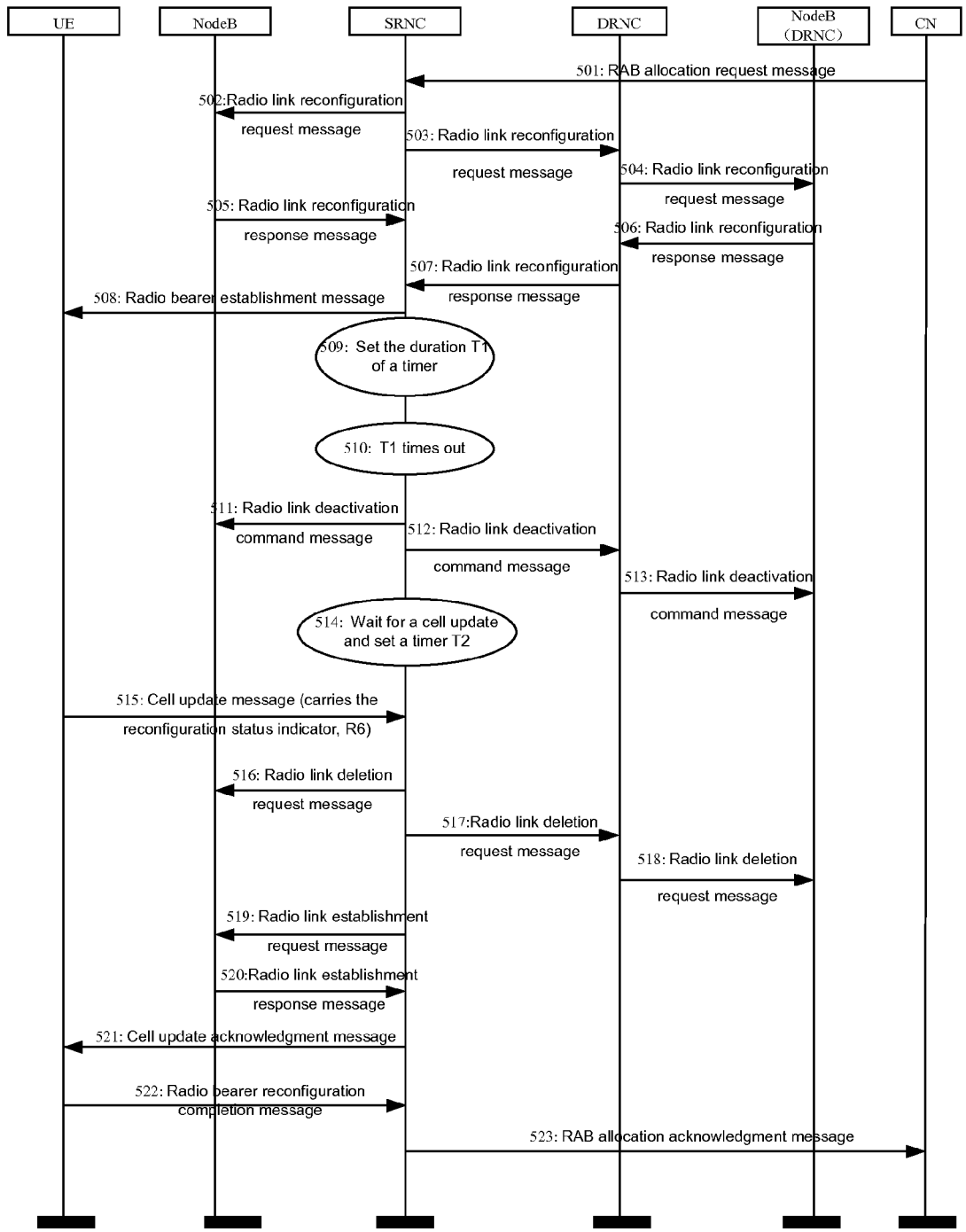

FIG. 5 shows a flow chart that the RNC receives a cell update message from the UE after RL (comprising DRNC RL) is deactivated when the timer for the RNC waiting for the air interface RB establishment response times out during the service establishment process. Compared with what shown in FIG. 4, processing of cross-IUR interface (logical interface between two RNCs, an interface between the Serving RNC (SRNC) and the Draft RNC (DRNC)) for the radio link deactivation message is added in FIG. 5. When the activation set of the UE comprises a DRNC radio link, an IUR interface is needed to transfer the radio link deactivation message to the DRNC. As shown in FIG. 5, the flow specifically comprises the steps as follows.

S501: the SRNC receives an RAB allocation request message sent by the CN.

S502: the SRNC sends a radio link reconfiguration request message to the NodeB.

S503: the SRNC sends a radio link reconfiguration request message to the DRNC.

S504: the DRNC sends a radio link reconfiguration request message to the NodeB (DRNC).

S505: the SRNC receives a radio link reconfiguration response message returned by the NodeB.

S506: the DRNC receives a radio link reconfiguration response message returned by the NodeB (DRNC).

S507: the SRNC receives a radio link reconfiguration response message returned by the DRNC.

S508: the SRNC sends a radio bearer establishment message to the UE.

S509: the SRNC sets an air interface timer T1 (the first predetermined period).

S510: the RNC determines that the timer T1 times out, that is, the RNC does not receive the response message from the UE within T1.

S511: the SRNC sends a radio link deactivation command message to the NodeB to deactivate the radio link to which the UE belongs.

S512: the SRNC sends a radio link deactivation command message to the DRNC.

S513: the DRNC sends a radio link deactivation command message to the NodeB (DRNC).

S514: the SRNC sets a timer T2 (the second predetermined period) and waits for a cell update message from the UE.

S515: the SRNC receives the cell update message from the UE before the timer T2 times out, and the cell update message carries the current reconfiguration status indicator of the UE.

S516: the SRNC sends a radio link deletion request message to the NodeB.

S517: the SRNC sends a radio link deletion request message to the DRNC.

S518: the DRNC sends a radio link deletion request message to the NodeB (DRNC).

S519: the SRNC sends a radio link establishment request message to the NodeB.

S520: the SRNC receives a radio link establishment response message returned by the NodeB.

S521: the SRNC sends a cell update acknowledgment message to the UE.

S522: the SRNC receives a reconfiguration completion message returned by the UE.

S523: the SRNC sends a service assignment response message to the CN.

Figure 6:
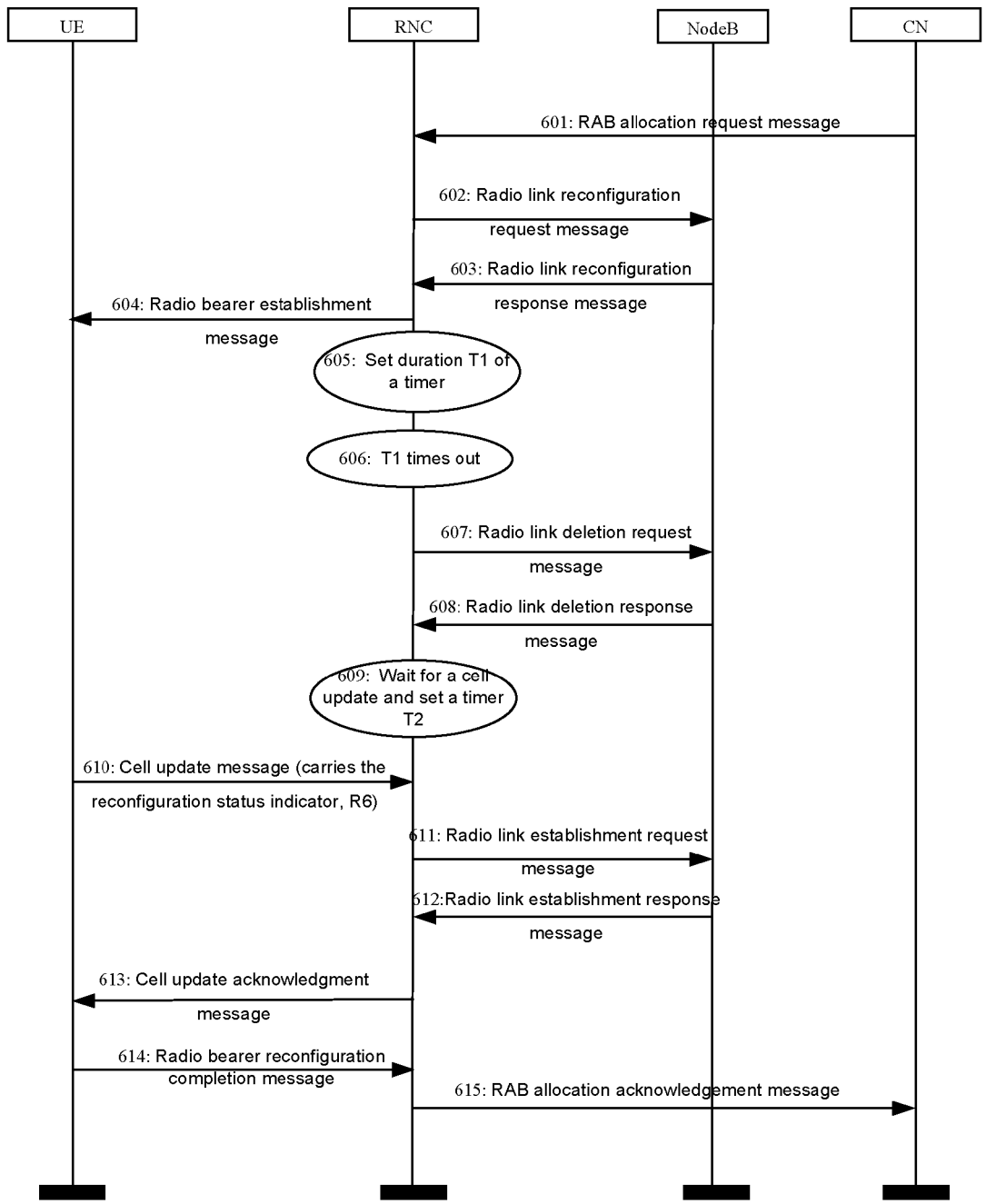

FIG. 6 shows a flow chart that the RNC receives a cell update message from the UE after RL (only comprising SRNC RL) is deleted when the timer for the RNC waiting for the air interface RB establishment response times out during the service establishment process. As shown in FIG. 6, the flow specifically comprises the steps as follows.

S601: the RNC receives an RAB allocation request message sent by the CN.

S602: the RNC sends a radio link reconfiguration message to the NodeB.

S603: the RNC receives a radio link reconfiguration response message returned by the NodeB.

S604: the RNC sends a radio bearer establishment message to the UE.

S605: the RNC sets an air interface waiting timer T1.

S606: the RNC determines that the timer T1 times out, that is, the RNC does not receive the response message from the UE within T1.

S607: the RNC sends a radio link deletion request message to the NodeB.

S608: the RNC receives a radio link deletion response message returned by the NodeB.

S609: the RNC sets a timer T2 and waits for a cell update message from the UE.

S610: the RNC receives the cell update message from the UE before the timer T2 times out.

S611: the RNC sends a radio link establishment request message to the NodeB.

S612: the RNC receives a radio link establishment response message returned by the NodeB.

S613: the RNC sends a cell update acknowledgment message to the UE.

S614: the RNC receives a reconfiguration completion message returned by the UE.

S615: the RNC sends a service assignment response message to the CN.

Figure 7:
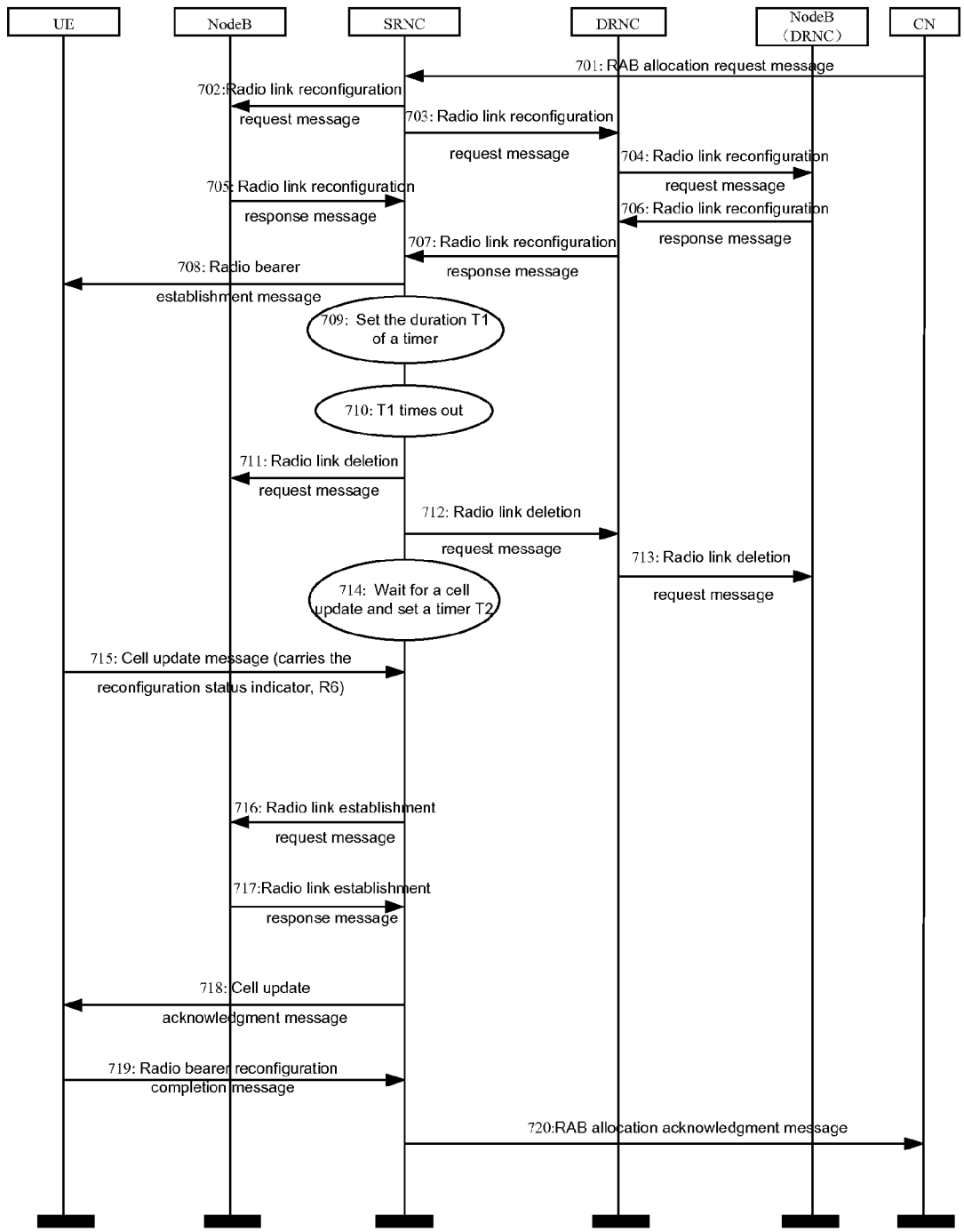

FIG. 7 shows a flow chart that the RNC receives a cell update message from the UE after RL (including DRNC RL) is deleted when the timer for the RNC waiting for the air interface RB establishment response times out during the service establishment process. FIG. 7 is similar to FIG. 6, the difference is that, after T1 times out, the deletion of the DRNC radio link is needed, and the SRNC transfers the radio link deletion to the DRNC via the IUR interface. As shown in FIG. 7, the flow specifically comprises the steps as follows.

S701: the SRNC receives an RAB allocation request message sent by the CN.

S702: the SRNC sends a radio link reconfiguration request message to the NodeB.

S703: the SRNC sends a radio link reconfiguration request message to the DRNC.

S704: the DRNC sends a radio link reconfiguration request message to the NodeB (DRNC).

S705: the SRNC receives a radio link reconfiguration response message returned by the NodeB.

S706: the DRNC receives a radio link reconfiguration response message returned by the NodeB (DRNC).

S707: the SRNC receives a radio link reconfiguration response message returned by the DRNC.

S708: the SRNC sends a radio bearer establishment message to the UE.

S709: the SRNC sets an air interface timer T1 (the first predetermined period).

S710: the RNC determines that the timer T1 times out, that is, the RNC does not receive the response message from the UE within T1.

S711: the SRNC sends a radio link deletion request message to the NodeB.

S712: the SRNC sends a radio link deletion request message to the DRNC.

S713: the DRNC sends a radio link deletion request message to the NodeB (DRNC).

S714: the SRNC sets a timer T2 (the second predetermined period) and waits for a cell update message from the UE.

S715: the SRNC receives the cell update message from the UE before the timer T2 times out, and the cell update message carries the current reconfiguration status indicator of the UE.

S716: the SRNC sends a radio link establishment request message to the NodeB.

S717: the SRNC receives a radio link establishment response message returned by the NodeB.

S718: the SRNC sends a cell update acknowledgment message to the UE.

S719: the SRNC receives a reconfiguration completion message returned by the UE.

S720: the SRNC sends a service assignment response message to the CN.

Figure 8:
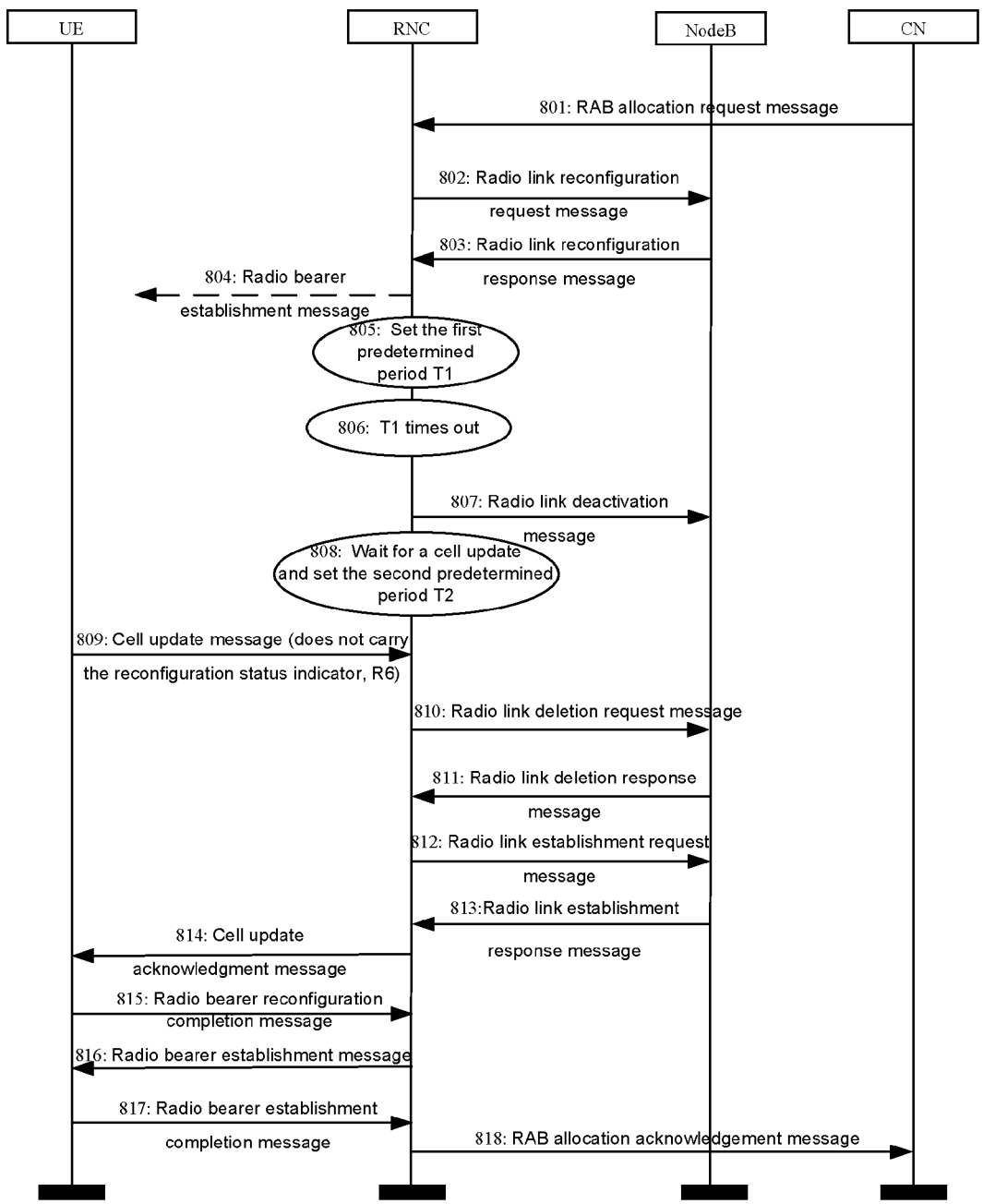

FIG. 8 shows a flow chart that the UE does not receive the RB establishment message and the RNC deactivates the radio link to trigger the call reestablishment during the service establishment process. As shown in FIG. 8, the flow specifically comprises the steps as follows.

S801: the RNC receives an RAB allocation request message sent by the CN.

S802: the RNC sends a radio link reconfiguration message to the NodeB.

S803: the RNC receives a radio link reconfiguration response message returned by the NodeB;

S804: the RNC sends a radio bearer establishment message to the UE, and that the radio bearer establishment message is represented by a broken line indicates the message is not sent to the UE.

S805: the RNC sets an air interface waiting timer T1.

S806: the RNC determines that the timer T1 times out, that is, the RNC does not receive the response message from the UE within T1.

S807: the RNC sends a radio link deactivation command message to the NodeB to deactivate the radio link to which the UE belongs.

S808: the RNC sets a timer T2 and waits for a cell update message from the UE.

S809: the RNC receives the cell update message reported by the UE before the timer T2 times out, and the message does not carry the reconfiguration indicator cell, which indicates that the UE does not execute reconfiguration processing.

S810: the RNC sends a radio link deletion request message to the NodeB.

S811: the RNC receives a radio link deletion response message returned by the NodeB.

S812: the RNC sends a radio link establishment request message to the NodeB.

S813: the RNC receives a radio link establishment response message returned by the NodeB.

S814: the RNC sends a cell update acknowledgment message to the UE.

S815: the RNC receives a reconfiguration completion message returned by the UE.

S816: after the call reestablishment is completed, the RNC sends a radio bearer establishment message to the UE.

S817: the RNC receives an RB establishment response message returned by the UE.

S818: the RNC sends a service assignment response message to the CN.

Figure 9:
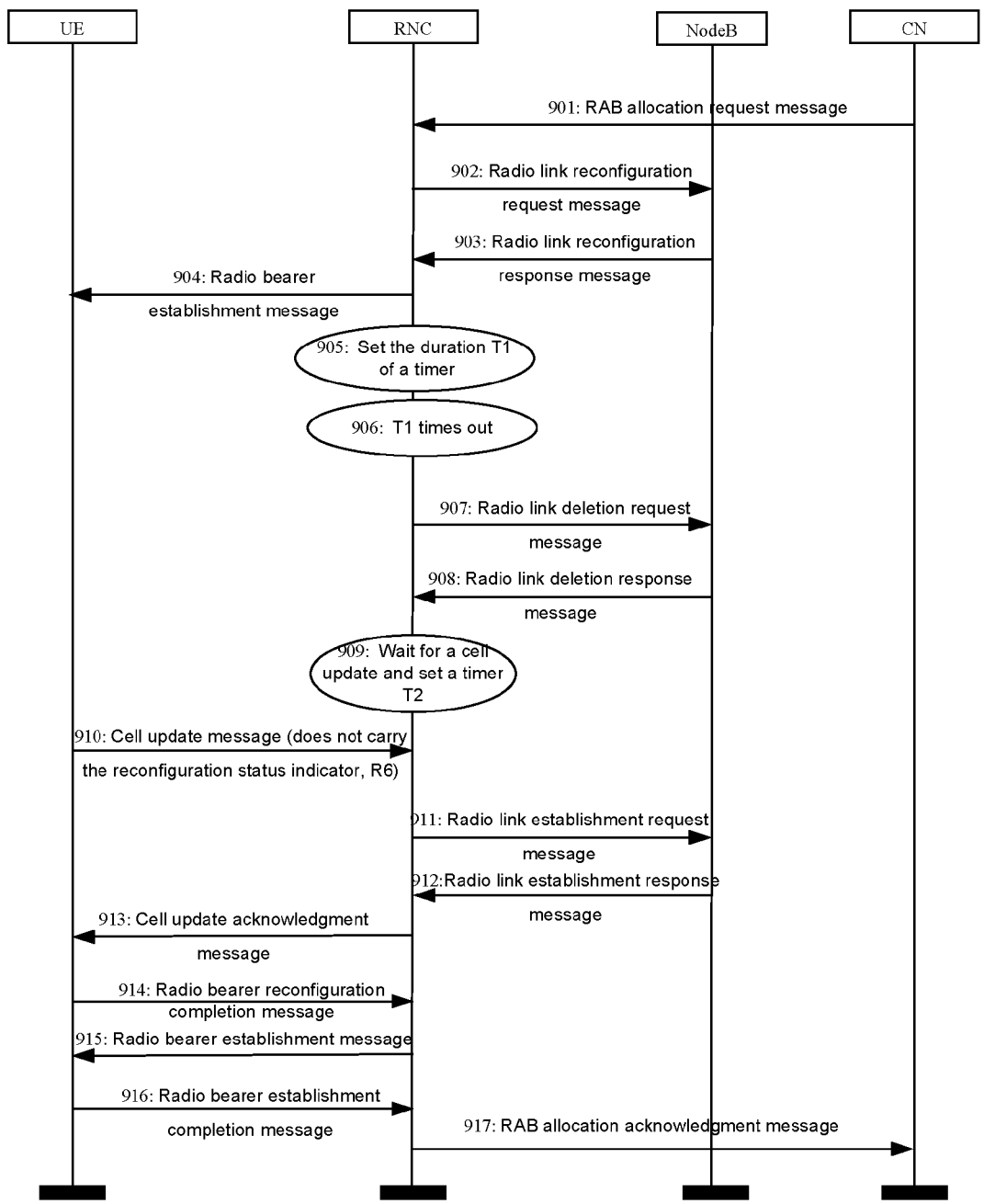

FIG. 9 shows a flow chart that the UE does not receive the RB establishment message and the RNC deletes the radio link to trigger the call reestablishment during the service establishment process. FIG. 9 is similar to FIG. 8, wherein after the radio link is deleted to trigger the call reestablishment, an RB establishment message is sent to the UE to establish a service radio bearer. As shown in FIG. 9, the flow specifically comprises the steps as follows.

S901: the RNC receives an RAB allocation request message sent by the CN.

S902: the RNC sends a radio link reconfiguration message to the NodeB.

S903: the RNC receives a radio link reconfiguration response message returned by the NodeB.

S904: the RNC sends a radio bearer establishment message to the UE, and that the radio bearer establishment message is represented by a broken line indicates that the message is not sent to the UE.

S905: the RNC sets an air interface waiting timer T1.

S906: the RNC determines that the timer T1 times out, that is, the RNC does not receive the response message from the UE within T1.

S907: the RNC sends a radio link deletion request message to the NodeB.

S908: the RNC receives a radio link deletion response message returned by the NodeB.

S909: the RNC sets a timer T2 and waits for a cell update message from the UE.

S910: the RNC receives the cell update message reported by the UE before the timer T2 times out, and the message does not carry the reconfiguration indicator cell, which indicates that the UE does not execute reconfiguration processing.

S911: the RNC sends a radio link establishment request message to the NodeB.

S912: the RNC receives a radio link establishment response message returned by the NodeB.

S913: the RNC sends a cell update acknowledgment message to the UE.

S914: the RNC receives a reconfiguration completion message returned by the UE.

S915: after the call reestablishment is completed, the RNC sends a radio bearer establishment message to the UE.

S916: the RNC receives an RB establishment response message returned by the UE.

S917: the RNC sends a service assignment response message to the CN.

Figure 10:
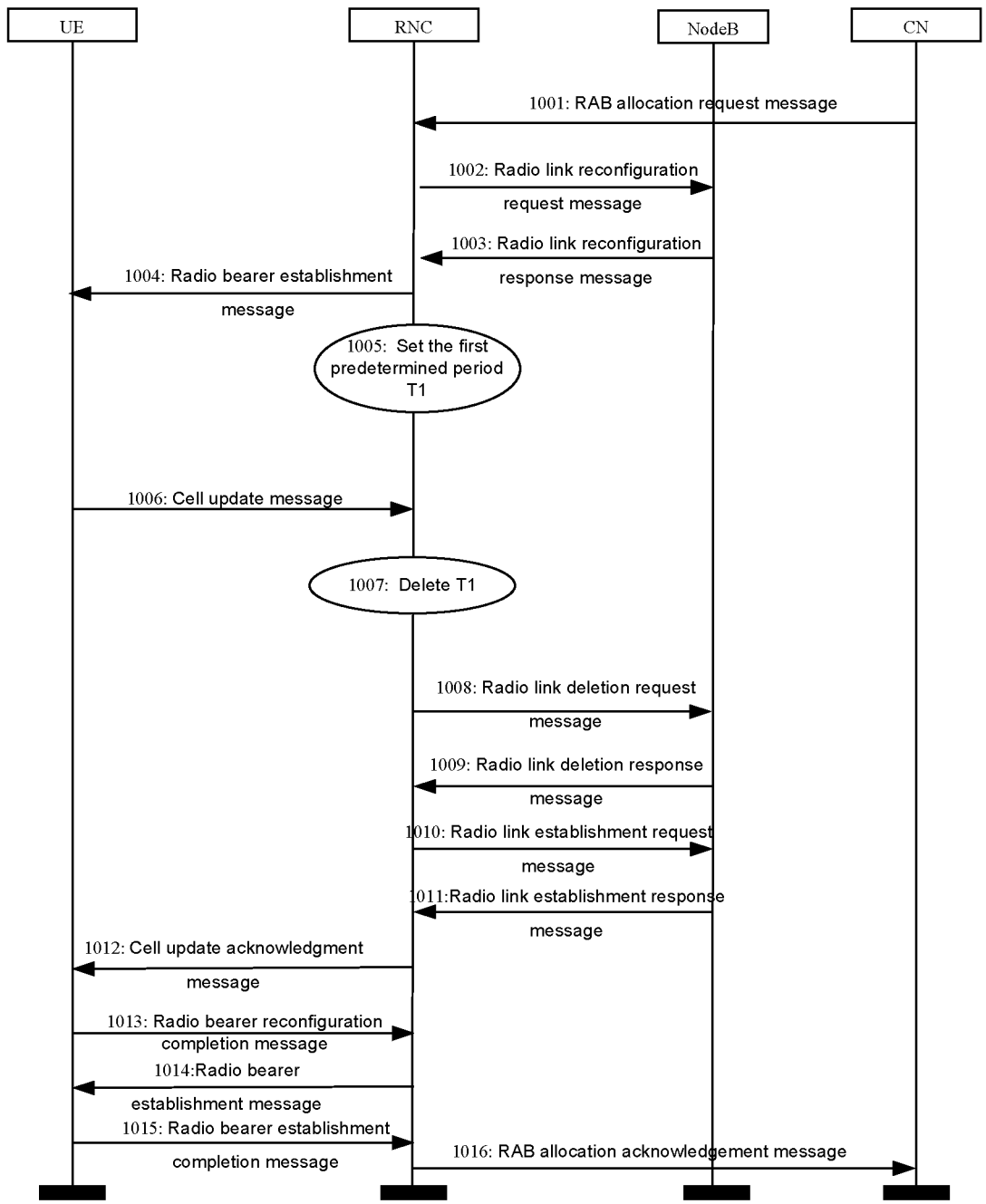

FIG. 10 shows a flow chart that the RNC receives a cell update before the air interface response times out during the service establishment process. As shown in FIG. 10, the flow specifically comprises the steps as follows.

S1001: the RNC receives an RAB allocation request message sent by the CN.

S1002: the RNC sends a radio link reconfiguration message to the NodeB.

S1003: the RNC receives a radio link reconfiguration response message returned by the NodeB.

S1004: the RNC sends a radio bearer establishment message to the UE.

S1005: the RNC sets an air interface waiting timer T1.

S1006: the RNC receives a cell update from the UE before the timer T1 times out.

S1007: the RNC deletes the timer T1.

S1008: the RNC sends a radio link deletion request message to the NodeB.

S1009: the RNC receives a radio link deletion response message returned by the NodeB.

S1010: the RNC sends a radio link establishment request message to the NodeB.

S1011: the RNC receives a radio link establishment response message returned by the NodeB.

S1012: the RNC sends a cell update acknowledgment message to the UE.

S1013: the RNC receives a reconfiguration completion message returned by the UE.

S1014: after the call reestablishment is completed, the RNC sends an RB establishment message to the UE to establish a service radio bearer.

S1015: the RNC receives an RB establishment response message returned by the UE.

S1016: the RNC sends a service assignment response message to the CN.

In the above flow charts, FIG. 4-FIG. 7 show specific embodiments in which the timer for the RNC waiting for the air interface response times out, wherein in FIG. 4 and FIG. 5, the radio link deactivation way is used to trigger the call reestablishment; and in FIG. 6 and FIG. 7, the radio link deletion way is used to trigger the call reestablishment. FIG. 4 and FIG. 6 are charts of processing (only comprising the Serving-side link); FIG. 5 and FIG. 7 are charts of processing (comprising the Draft-side link). FIG. 8 and FIG. 9 show specific embodiments in which the UE does not receive an RB establishment message, wherein in FIG. 8, the radio link deactivation way is used to trigger the call reestablishment, and in FIG. 9, the radio link deletion way is used to trigger the call reestablishment. FIG. 10 shows a specific embodiment in which the RNC receives a cell update before the air interface response times out.

Figure 11:
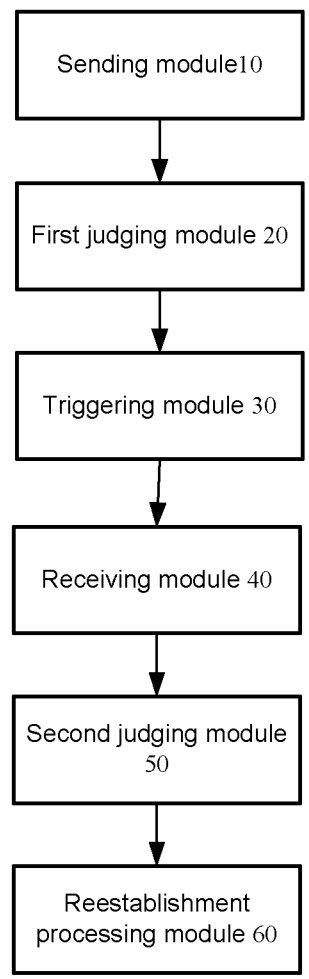
FIG. 11 is a block diagram of a radio network controller according to one embodiment of the present invention.

To implement the above methods, the present invention further provides a radio network controller. FIG. 11 is a block diagram of a radio network controller according to one embodiment of the present invention, and as shown in FIG. 11, the radio network controller comprises:

a sending module 10, configured to send a radio bearer establishment message to a user equipment; a first judging module 20, configured to judge whether a radio bearer response message from the user equipment is not received within a first predetermined period; a triggering module 30, configured to trigger, when the result of judgment of the first judging module is YES, the user equipment to report a cell update message; a receiving module 40, configured to receive the cell update message from the user equipment; a second judging module 50, configured to determine a configuration status of the user equipment according to the information carried in the cell update message and/or the time when receiving the cell update message; and a reestablishment processing module 60, configured to perform call reestablishment processing according to the configuration status of the user equipment determined by the second judging module.

In the above, the triggering module 30 triggers the user equipment to report the cell update message by sending a radio link deactivation message or radio link deletion message to a NodeB to which the user equipment belongs.

In the above, the second judging module 50 further comprises: a first judging sub-module, configured to determine that the user equipment is in a first configuration status when the cell update message does not carry the reconfiguration information of the user equipment; a second judging sub-module, configured to determine that the user equipment is in the first configuration status when the cell update message is received within the first predetermined period and the cell update message carries the reconfiguration information of the user equipment; and a third judging sub-module, configured to determine that the user equipment is in a second configuration status when the cell update message is received after the first predetermined period lapses and the cell update message carries the reconfiguration information of the user equipment.

The present invention further provides a radio network controller, and the radio network controller comprises:

a first sending module, configured to send a radio bearer establishment message to a user equipment;

a first judging module, configured to judge whether a radio bearer response message from the user equipment is not received within a first predetermined period;

a triggering module, configured to trigger, when the result of judgment of the first judging module is YES, the user equipment to report a cell update message;

a second sending module, configured to send a radio link deactivation message or radio link deletion message to a drift radio network controller;

a receiving module, configured to receive the cell update message from the user equipment;

a second judging module, configured to determine a configuration status of the user equipment according to the information carried in the cell update message and/or the time when receiving the cell update message; and a reestablishment processing module, configured to perform call reestablishment processing according to the configuration status of the user equipment determined by the second judging module.

In the specific implementation, the working flows of the radio network controller according to embodiments of the present invention may be learned by referring to FIG. 2-FIG. 10, which will not be described again herein.

In conclusion, according to the above technical solutions of the present invention, the dropped call resulted from the air interface failure may be retrieved effectively, and the network call completion ratio is improved.

The descriptions above are only preferable embodiments of the present invention and are not used for limiting the present invention. For persons skilled in the art, the present invention may have various alternations and changes. Any modifications, equivalent replacements and improvements, etc. within the spirit and principle of the present invention should be contained within the protection scope of the present invention.

INDUSTRIAL APPLICABILITY

In the present invention, by inserting the call reestablishment during the service establishment process, the RNC triggers the UE to report the cell update message to determine the configuration status of the UE, so that the configuration states of both the RNC and the UE are consistent during the call reestablishment processing, and thereby the network call completion ratio is improved.

What is claimed is:

1. An implementation method for improving a service call completion ratio, comprising:

a radio network controller sending a radio bearer establishment message to a user equipment;

the radio network controller judging that a radio bearer response message from the user equipment is not received within a first predetermined period, the radio network controller triggering the user equipment to report a cell update message;

the radio network controller receiving the cell update message from the user equipment and determining a configuration status of the user equipment according to information carried in the cell update message and/or time when receiving the cell update message; and the radio network controller performing call reestablishment processing according to the configuration status of the user equipment.

2. The method according to claim 1, wherein the step of the radio network controller triggering the user equipment to report the cell update message comprises:

the radio network controller triggering the user equipment to report the cell update message by sending a radio link deactivation message or a radio link deletion message to a NodeB to which the user equipment belongs.

3. The method according to claim 1, wherein the step of the radio network controller determining the configuration status of the user equipment according to the information carried in the cell update message and/or the time when receiving the cell update message comprises:

determining that the user equipment is in a first configuration status if the cell update message does not carry reconfiguration information of the user equipment;

determining that the user equipment is in the first configuration status if the cell update message is received within the first predetermined period and the cell update message carries the reconfiguration information of the user equipment; and determining that the user equipment is in a second configuration status if the cell update message is received after the first predetermined period elapses and the cell update message carries the reconfiguration information of the user equipment.

4. The method according to claim 3, wherein a sum of the first predetermined period and the second predetermined period is less than a third predetermined period, wherein the second predetermined period is a time that a radio link failure is detected at the user equipment side, and the third predetermined period is a period from a moment that the radio network controller receives a service assignment request from a core network to a moment that the radio network controller returns a service establishment completion to the core network.

5. The method according to claim 3, wherein the step of the radio network controller performing the call reestablishment processing according to the configuration status of the user equipment comprises:

the radio network controller performing, if the user equipment is in the first configuration status, the call reestablishment processing in the first configuration status, and then reestablishing a service radio bearer after the call reestablishment processing is successful; and the radio network controller performing, if the user equipment is in the second configuration status, the call reestablishment processing in the second configuration status.

6. The method according to claim 1, wherein if the radio network controller receives a radio bearer response message from the user equipment within the first predetermined period, the method further comprises:

the radio network controller receiving the cell update message actively reported by the user equipment;

the radio network controller determining that the user equipment is in the first configuration status; and the radio network controller performing the call reestablishment processing in the first configuration status.

7. An implementation method for improving a service call completion ratio, comprising:
- a serving radio network controller sending a radio bearer establishment message to a user equipment;
- the serving radio network controller judging that a radio bearer response message from the user equipment is not received within a first predetermined period, the serving radio network controller triggering the user equipment to report a cell update message;
- the serving radio network controller sending a radio link deactivation message or a radio link deletion message to a drift radio network controller;
- the serving radio network controller receiving the cell update message from the user equipment and determining a configuration status of the user equipment according to information carried in the cell update message and/or time when receiving the cell update message; and
- the serving radio network controller performing call reestablishment processing according to the configuration status of the user equipment.

8. A radio network controller, characterized by comprising:
- a sending module, configured to send a radio bearer establishment message to a user equipment;
- a first judging module, configured to judge whether a radio bearer response message from the user equipment is not received within a first predetermined period;
- a triggering module, configured to trigger, when a result of judgment of the first judging module is YES, the user equipment to report a cell update message;
- a receiving module, configured to receive the cell update message from the user equipment; and
- a second judging module, configured to determine a configuration status of the user equipment according to information carried in the cell update message and/or time when receiving the cell update message;
- a reestablishment processing module, configured to perform call reestablishment processing according to the configuration status of the user equipment determined by the second judging module; and
- a first hardware processor, configured to execute the sending module, the first judging module, the triggering module, the receiving module, the second judging module and the reestablishment processing module.

9. The radio network controller according to claim 8, wherein the triggering module triggers the user equipment to report the cell update message by sending a radio link deactivation message or a radio link deletion message to a NodeB to which the user equipment belongs.

10. The radio network controller according to claim 8, wherein the second judging module further comprises:
- a first judging sub-module, configured to determine that the user equipment is in a first configuration status when the cell update message does not carry reconfiguration information of the user equipment;
- a second judging sub-module, configured to determine that the user equipment is in the first configuration status when the cell update message is received within the first predetermined period and the cell update message carries the reconfiguration information of the user equipment; and
- a third judging sub-module, configured to determine that the user equipment is in a second configuration status when the cell update message is received after the first predetermined period elapses and the cell update message carries the reconfiguration information of the user equipment.

11. A radio network controller, comprising:
- a first sending module, configured to send a radio bearer establishment message to a user equipment;
- a first judging module, configured to judge whether a radio bearer response message from the user equipment is not received within a first predetermined period;
- a triggering module, configured to trigger, when a result of judgment of the first judging module is YES, the user equipment to report a cell update message;
- a second sending module, configured to send a radio link deactivation message or a radio link deletion message to a drift radio network controller;
- a receiving module, configured to receive the cell update message from the user equipment;
- a second judging module, configured to determine a configuration status of the user equipment according to information carried in the cell update message and/or time when receiving the cell update message; and
- a reestablishment processing module, configured to perform call reestablishment processing according to the configuration status of the user equipment determined by the second judging module;
- a second hardware processor, configured to execute the first sending module, the first judging module, the triggering module, the second sending module, the receiving module, the second judging module and the reestablishment processing module.

* * * * *